April 14, 1925.
R. S. HISLOP
DEPOSITOR FOR PLASTIC MATERIALS
Filed June 5, 1924
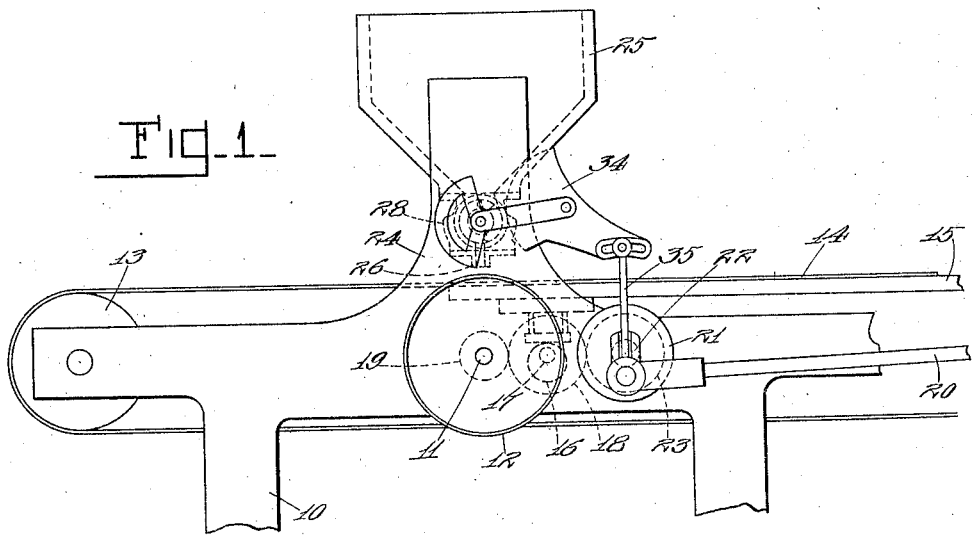
Fig. 1.
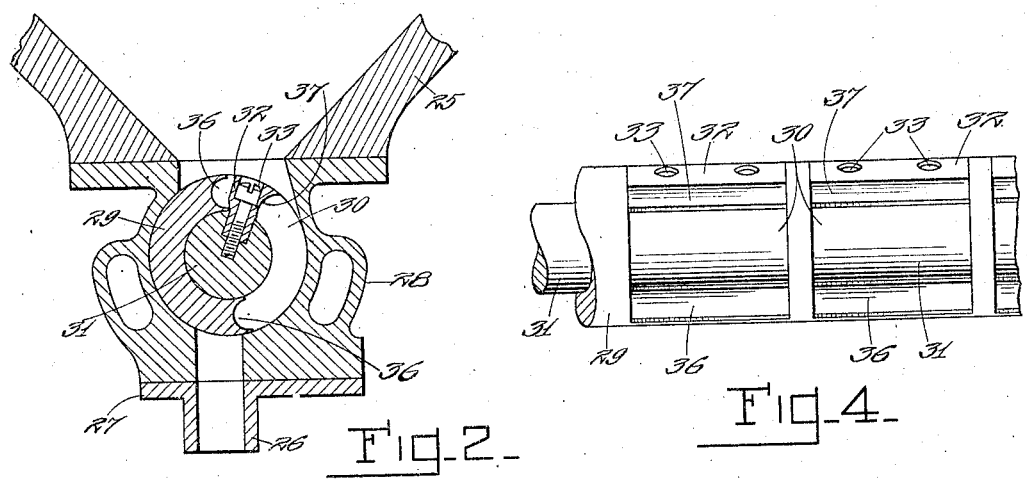
Fig. 2.
Fig. 4.
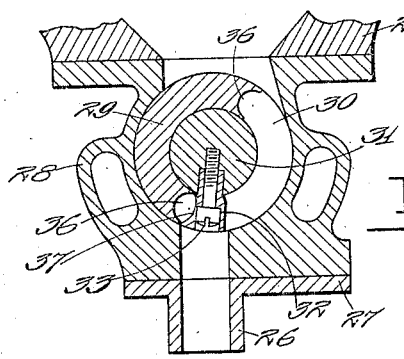
Fig. 3.
INVENTOR:
Robert Scott Hislop.
by Macleod, Calver, Copeland & Dike,
Att'ys.

Patented Apr. 14, 1925.

1,533,597

UNITED STATES PATENT OFFICE.

ROBERT SCOTT HISLOP, OF RACINE, WISCONSIN, ASSIGNOR TO RACINE CONFECTIONERS' MACHINERY COMPANY, OF RACINE, WISCONSIN.

DEPOSITOR FOR PLASTIC MATERIALS.

Application filed June 5, 1924. Serial No. 718,000.

*To all whom it may concern:*

Be it known that I, ROBERT SCOTT HISLOP, a citizen of the United States, residing at Racine, county of Racine, State of Wisconsin, have invented a certain new and useful Improvement in Depositors for Plastic Materials, of which the following is a specification, reference being had therein to the accompanying drawings.

This invention relates especially, although not exclusively, to machines of the general type shown and described in the patent to Demerath, No. 791,611, June 6, 1905, and employed in the manufacture of confectionery and the like for the purpose of depositing measured quantities of plastic material, such as chocolate, cream compositions, etc. The invention has for its object to provide mechanism of this general character adapted for use in connection with plastic materials containing fruits, nut meats, raisins and other solid substances which are likely to be crushed by depositing devices of the type now generally in use.

The more particular objects of the invention, together with means whereby the same may be carried into effect, will best be understood from the following description of one form or embodiment thereof illustrated in the accompanying drawings. It will be understood, however, that the particular construction described and shown has been chosen for illustrative purposes merely, and that the invention, as defined by the claims hereunto appended, may be otherwise embodied without departure from its spirit and scope.

In said drawings:

Fig. 1 is a side elevation of a machine for forming deposited confections and employing depositing mechanism embodying the invention.

Figs. 2 and 3 are enlarged sections of the depositor, showing the parts in different positions.

Fig. 4 is a side elevation of a portion of the measuring valve.

In Fig. 1 is shown a confectionery machine in whose frame 10 is journalled a main shaft 11 carrying a belt pulley 12 through which power from any suitable source is applied to the machine. Rotatably supported at the ends of the machine are drums, one of which is shown at 13, about which passes an endless conveyor belt 14, the upper reach of which passes over a table 15 which is periodically lifted by a cam 16 on a shaft 17 provided with a gear 18 which meshes with a gear 19 on the shaft 11. The belt 14 is intermittently advanced by ratchet mechanism (not shown) operated through a connecting rod 20 from a crank disk 21 on a shaft 22 provided with a gear 23 meshing with the gear 18. The parts above referred to are not shown in full herein and will not be further described since they form no portion of the present invention and may be of any construction and arrangement well known in the art.

Supported by uprights 24 from the frame 10, above the upper reach of the conveyor belt 14, is the depositor to which the present invention relates and which is adapted to deposit measured quantities of plastic material upon the upper reach of said belt, or upon suitable trays carried thereby, between the successive movements of the belt and as the upper reach of the latter is lifted into proximity to said depositor by the table 15 and cam 16.

Supported by the uprights 24 is a reservoir or hopper 25 adapted to contain the mass of plastic material, said reservoir having an outlet in the form of one or more nozzles 26 carried by or formed integral with a plate 27 between which and the reservoir 25 is interposed the casing 28 of a measuring valve adapted to control the passage of the material from the reservoir to the nozzles.

The measuring valve comprises an oscillating sleeve 29 substantially fitting the interior of the valve casing 28 and formed with one or more recesses 30 corresponding in number and arrangement to the nozzles 26, said recesses being adapted, as the sleeve is oscillated, to communicate with the bottom of the reservoir 25 or with the nozzles 26. Journalled in the sleeve 29 is an oscillating shaft 31 having one or more radial plungers 32 operating in the recesses 30 in the sleeve 29. Said plungers as herein shown comprise blades or ribs seated in grooves in the shaft and secured in place by screws 33.

The mechanism for operating the measuring valve is indicated by the numeral 34 in Fig. 1 and is actuated by a pitman 35 from the crank disk 21. This mechanism is not shown in detail herein and may be substantially as shown and described in the Demerath patent above referred to. For the purpose of the present description it is sufficient to say that the sleeve 29 is oscillated to bring the recess 30 alternately into communication with the reservoir 25 and nozzle 26, and that the shaft 31 is also periodically oscillated to cause a relative movement of the plunger 32 in said recess between the end walls of the latter, whereby measured quantities of plastic material are alternately drawn from the reservoir into the recess and then expelled from the latter through the nozzle.

At the completion of each depositing operation, the face of the plunger is brought into engagement with the opposed face afforded by the end wall of the recess, in order to expel the material completely and measure the same accurately, and mechanism of this character, as heretofore constructed, has therefore been limited to use with homogeneous and completely plastic materials, since any solid substances, such as fruits or nut meats, if present in the mixture, would become lodged between these opposed faces and crushed thereby. In accordance with the present invention, however, one or both of these faces is relieved to provide a pocket of constant volume into which solid substances so lodged are received so as to prevent their being crushed in this manner. As shown, the end walls of the recess 30 are formed with cylindrical grooves 36 which are closed by the opposed faces of the plunger 32 when the latter reaches its limits of movement with respect to said recess, while one of the faces of said plunger is also formed with a similar and opposed cylindrical groove 37. A solid mass, such as a nut meat or a piece of fruit, caught between the plunger and the end of the recess during the expulsion of the plastic material from the latter merely enters the pocket 36, or the pockets 36 and 37, forcing out an equal amount of plastic material, and is not crushed. Since a constant quantity of material is at all times retained in the pockets, the accurate measurement of the quantities deposited is not affected.

Having thus described my invention, I claim:

1. A depositor for plastic material comprising a reservoir for the material, a valve casing communicating with said reservoir and having an outlet through which said material is deposited, a measuring valve in said casing for discharging measured quantities of said material through said outlet, said valve including a member having a recess to receive measured quantities of the material from said reservoir, and a plunger operating in said recess to expel said material therefrom, and means for operating said valve, said parts being constructed and arranged to provide a pocket of constant volume between the wall of said recess and the opposed face of said plunger when the latter reaches its limit of movement with respect to the former.

2. In a depositor for plastic material, a valve casing, a valve member therein, said valve member having a recess, and a second vale member having a plunger operating in said recess to expel the material therefrom, one of said members being relieved to form a pocket between the wall of said recess and the opposed face of said plunger when the latter reaches its limit of movement with respect to the former.

3. In a depositor for plastic material, a valve casing, a valve member therein, said valve member having a recess, and a second valve member having a plunger operating in said recess to expel the material therefrom, said recess and plunger having opposed faces which are brought substantially into engagement with one another at the limits of movement of said plunger with respect to said recess, the faces of one of said members being provided with pockets.

4. In a depositor for plastic material, a valve casing, a valve member therein, said valve member having a recess the end walls of which are provided with grooves, and a plunger movable in said recess to expel the material therefrom.

5. In a depositor for plastic material, a casing, an oscillating sleeve therein, said sleeve having a recess, and an oscillating shaft in said sleeve having a radially disposed plunger in said recess, one of said parts having a pocket to receive a constant quantity of said material at the limits of movement of said plunger with respect to said recess.

6. In a depositor for plastic material, a casing, an oscillating sleeve therein, said sleeve having a recess the end walls of which are provided with substantially cylindrical grooves, and an oscillating shaft in said sleeve having a radially disposed plunger operating in said recess.

In testimony whereof I affix my signature.

ROBERT SCOTT HISLOP.